(12) United States Patent
Budd et al.

(10) Patent No.: US 11,414,342 B2
(45) Date of Patent: Aug. 16, 2022

(54) GLASS GRANULE HAVING A ZONED STRUCTURE

(71) Applicant: 3M INNOVATIVE PROPERTIES COMPANY, St. Paul, MN (US)

(72) Inventors: Kenton D. Budd, Woodbury, MN (US); Robert P. Brown, Hudson, WI (US); Rebecca L. Everman, St. Paul, MN (US); Craig W. Lindsay, Minneapolis, MN (US); Jean A. Tangeman, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 47 days.

(21) Appl. No.: 14/426,183

(22) PCT Filed: Sep. 11, 2013

(86) PCT No.: PCT/US2013/059231
§ 371 (c)(1),
(2) Date: Mar. 5, 2015

(87) PCT Pub. No.: WO2014/043212
PCT Pub. Date: Mar. 20, 2014

(65) Prior Publication Data
US 2015/0266774 A1    Sep. 24, 2015

Related U.S. Application Data

(60) Provisional application No. 61/749,726, filed on Jan. 7, 2013, provisional application No. 61/699,672, filed
(Continued)

(51) Int. Cl.
*C03C 11/00* (2006.01)
*C03B 19/06* (2006.01)
(Continued)

(52) U.S. Cl.
CPC .............. *C03C 11/00* (2013.01); *C03B 19/06* (2013.01); *C03C 12/00* (2013.01);
(Continued)

(58) Field of Classification Search
None
See application file for complete search history.

(56) References Cited

U.S. PATENT DOCUMENTS 2,810,660 A    10/1957   Carpenter
3,354,024 A    11/1967   D'eustachio
(Continued)

FOREIGN PATENT DOCUMENTS

CN    101239839 A    8/2008
DE    4417391        11/1995
(Continued)

OTHER PUBLICATIONS

International Search Report for PCT International Application No. PCT/US2013/059231, dated Nov. 5, 2014, 4pgs.

*Primary Examiner* — Ronak C Patel (57) ABSTRACT

A granule and building material including a granule having an inner zone and an outer zone that at least partially surrounds the inner zone and that comprises greater than 10% of the total volume of the granule is provided.

9 Claims, 8 Drawing Sheets

Related U.S. Application Data on Sep. 11, 2012, provisional application No. 61/749,707, filed on Jan. 7, 2013.

(51) Int. Cl.
  *C04B 20/10* (2006.01)
  *C04B 38/00* (2006.01)
  *C03C 12/00* (2006.01)
  *E04D 1/28* (2006.01)
  *C04B 111/00* (2006.01)

(52) U.S. Cl.
  CPC ...... *C04B 20/1074* (2013.01); *C04B 38/0038* (2013.01); *E04D 1/28* (2013.01); *C04B 2111/00586* (2013.01); *Y10T 428/2982* (2015.01)

(56) References Cited

U.S. PATENT DOCUMENTS

| | | | |
|---|---|---|---|
| 3,963,503 A | 6/1976 | Mackenzie | |
| 4,303,431 A | 12/1981 | Torobin | |
| 4,582,425 A | 4/1986 | Rabine | |
| 5,225,123 A | 7/1993 | Torobin | |
| 5,516,348 A | 5/1996 | Conwell | |
| 5,823,661 A | 10/1998 | Mahanay | |
| 5,902,755 A * | 5/1999 | Driggett | C04B 26/08 442/172 |
| 6,174,360 B1 | 1/2001 | Sliwinski | |
| 6,454,848 B2 | 9/2002 | Sliwinski | |
| 6,500,544 B1 | 12/2002 | Tiitu | |
| 7,060,658 B2 | 6/2006 | Joedicke | |
| 7,241,500 B2 | 7/2007 | Shiao | |
| 7,452,598 B2 | 11/2008 | Shiao | |
| 7,455,899 B2 | 11/2008 | Gross | |
| 7,641,959 B2 | 1/2010 | Joedicke | |
| 7,811,630 B2 | 10/2010 | Hong | |
| 7,919,170 B2 | 4/2011 | Gross | |
| 8,034,432 B2 | 10/2011 | Joedicke | |
| 8,491,985 B2 | 7/2013 | Kalkanoglu | |
| 8,623,499 B2 | 1/2014 | Vaisnoff | |
| 8,637,116 B2 | 1/2014 | Shiao | |
| 2003/0152747 A1 | 8/2003 | Fensel | |
| 2005/0238848 A1 | 10/2005 | Fensel | |
| 2006/0016598 A1 | 1/2006 | Urbanek | |
| 2006/0084727 A1* | 4/2006 | Yan | C08G 59/226 523/444 |
| 2007/0065640 A1 | 3/2007 | Joedicke | |
| 2007/0065641 A1* | 3/2007 | Joedicke | C04B 20/1059 428/143 |
| 2007/0104949 A1 | 5/2007 | Bunge | |
| 2008/0026183 A1* | 1/2008 | Vanpoulle | A01N 25/12 428/143 |
| 2008/0118640 A1 | 5/2008 | Kalkanoglu | |
| 2008/0241472 A1 | 10/2008 | Shiao | |
| 2010/0098777 A1 | 4/2010 | Gould | |
| 2010/0139194 A1 | 6/2010 | Burns | |
| 2010/0151198 A1 | 6/2010 | Khan | |
| 2010/0151199 A1* | 6/2010 | Shiao | E04D 5/12 428/144 |
| 2010/0152030 A1 | 6/2010 | Bai | |
| 2010/0203336 A1 | 8/2010 | Shiao | |
| 2011/0086201 A1 | 4/2011 | Shiao | |
| 2011/0159240 A1 | 6/2011 | Shiao | |
| 2011/0223385 A1 | 9/2011 | Shiao | |
| 2011/0251051 A1 | 10/2011 | Bai | |
| 2012/0157583 A1 | 6/2012 | Shiao | |
| 2013/0323500 A1* | 12/2013 | McInerney | C09D 5/26 428/325 |
| 2014/0004168 A1* | 1/2014 | Petit | A01N 25/26 424/417 |

FOREIGN PATENT DOCUMENTS

| | | |
|---|---|---|
| EP | 2360129 | 8/2011 |
| JP | 3204601 | 1/1997 |
| JP | H09-286674 | 11/1997 |
| JP | 2000-034179 | 2/2000 |
| RS | 20100128 | 10/2011 |
| WO | WO 2000-61496 | 10/2000 |
| WO | WO 2003-55822 | 7/2003 |
| WO | WO 2003-087002 | 10/2003 |
| WO | WO 2011-022011 | 2/2011 |
| WO | WO 2011-101659 | 8/2011 |
| WO | WO 2011/153369 | 12/2011 |
| WO | WO 2013-165650 | 11/2013 |
| WO | WO 2014-042987 | 3/2014 |
| WO | WO 2014-042988 | 3/2014 |

* cited by examiner

GLASS GRANULE HAVING A ZONED STRUCTURE

CROSS REFERENCE TO RELATED APPLICATIONS

This application is a national stage filing under 35 U.S.C. 371 of PCT/US2013/059231, filed Sep. 11, 2013, which claims priority to Provisional Application Nos. 61/749,707 filed Jul. 1, 2013, 61/749,726 filed Jul. 1, 2013, and 61/699,672 filed Sep. 11, 2012, the disclosures of which are incorporated by reference in their entirety herein.

TECHNICAL FIELD

The present disclosure relates to building materials. More specifically, the present disclosure relates to granules derived from fine glass particles including at least an inner zone and an outer zone.

BACKGROUND

For energy conservation purposes, it has become more desirable to reflect solar energy off of roofs and other exterior surfaces. Absorbed solar energy increases energy costs in buildings. In addition, in densely populated areas, such as metropolitan areas, the absorption of solar energy increases ambient air temperatures. A primary absorber of solar energy is building roofs. It is not uncommon for ambient air temperature in metropolitan areas to be at least 10° F. warmer than in surrounding rural areas. This phenomenon is commonly referred to as the urban heat island effect. Reflecting solar energy rather than absorbing it can reduce cooling costs and thereby energy costs in buildings. In addition, reducing solar energy absorption can enhance the quality of life in densely populated areas by helping to decrease ambient air temperatures.

Solar energy reflection can be achieved by using metallic or metal-coated roofing materials. However, because the heat emittance of metallic or metal-coating roofing materials is low, such materials do not produce significant gains in energy conservation and reduced costs since such materials restrict radiant heat flow.

Reflection of solar energy can also be accomplished by using white or light-colored roofs. However, white or light-colored sloped roofs are not accepted in the marketplace due to aesthetic reasons. Instead, darker roofs are preferred. However, darker roofs by their very nature through colored or non-white roofing materials absorb a higher degree of solar energy and reflect less.

Non-flat or sloped roofs commonly use shingles coated with colored granules adhered to the outer surface of the shingles. Such shingles are typically made of an asphalt base with the granules embedded in the asphalt. The roofing granules are used both for aesthetic reasons and to protect the underlying base of the shingle. The very nature of such granules creates significant surface roughness on the shingle. Solar radiation thereby encounters decreased reflectivity since the radiation is scattered in a multi-scattering manner that leads to increased absorption when compared to the same coating placed on a smooth surface.

SUMMARY

The present disclosure provides a building material including a granule having an inner zone and outer zone at least partially surrounding the inner zone. The inner zone and outer zone each include greater than 10% of a total volume of the roofing granule and the granule includes greater than 20% by volume of a glass. In various exemplary embodiments, the granule includes greater than 50% by volume of a glass, the outer zone includes greater than 50% by volume of a glass, and/or the inner zone includes greater than 50% by volume of a glass. In some exemplary embodiments, the outer zone includes between 20% and 70% of the total volume of the granule and the inner zone includes between 20% and 70% of the total volume of the granule.

In an exemplary embodiment, wherein the inner zone and outer zone differ in a property selected from the group consisting of hardness, porosity, and density. In various exemplary embodiments, the outer zone has an average pore volume between 2% and 15%, an average area percent of pores of the outer zone is between 2% and 15%, an average area percent of pores of the inner zone is less than 3%, and/or the average area percent of pores of the inner zone is less than 90% of the average area percent of pores of the outer zone.

The present disclosure further provides a granule including greater than 50% by volume of a glass having an inner zone and outer zone surrounding the inner zone, the inner zone and outer zone each including greater than 10% of a total volume of the roofing granule. The outer zone has a pore volume between 2% and 20% and that is greater than a pore volume of the inner zone.

The present disclosure further provides a process for making a building material including disposing a fine glass powder in a forming device, forming a green body of the fine glass powder, and heat treating the green body to cause at least partial densification of the glass powder in a direct fired kiln. The fired glass powder includes a granule having an inner zone and an outer zone differing in at least one property. In an exemplary embodiment, the outer zone has a greater porosity than the inner zone.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

All scientific and technical terms used herein have meanings commonly used in the art unless otherwise specified. The definitions provided herein are to facilitate understanding of certain terms used frequently herein and are not meant to limit the scope of the present disclosure.

The term "uncolored," such as in reference to granules or roofing granules, can be essentially white granules that are not designed to have specific absorption in the visible region of the solar spectra, as would be used to create a desired color appearance other than white.

The term "low solar absorption" can refer to materials that primarily reflect or transmit a large fraction of the total solar spectrum. Such a material would therefore primarily reflect or transmit most of the visible and near IR spectrum. In embodiments, a functional amount of a low solar absorption material (such as a layer of granules of base rock or coated base rock, or a thin layer of a granule coating material) would absorb less than 50%, preferably less than 30%, and preferably less than 20% of the total solar spectrum.

A solar opaque material is one that has low transmission of the total spectra. When a material is both solar opaque and has low solar absorption, it has high total reflectivity of the solar spectrum. Preferably, a functional amount of a solar opaque material (such as a layer of granules of base rock or coated base rock, or a thin layer of a granule coating material) would transmit less than 60%, more preferably less than 40%, and even more preferably less than 30% of the total solar spectrum.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

The present disclosure relates generally to granules derived from fine glass particles. The particles can include controlled porosity and/or pigments. The granules may be used as high total solar reflectance (TSR) white or uncolored granules due to the diffuse reflectance of the pores and low solar absorption of the glass. The glass particles are sufficiently sintered, fused, or coalesced to provide desired strength and sufficiently limited open porosity. In addition, the granules can comprise sufficient additional closed porosity and pigments to provide high reflectivity and ultraviolet (UV) blocking properties. In some embodiments, the granule features enable roofing having a total solar reflectance of up to or even greater than 70% (e.g., 25%, 30%, 35%, 40%, 45%, 50% 55%, 60%, 65%, 70%, 75%, 80%, 85%, or 90%), and have moderate to low cost. Alternatively, the granules of the present disclosure can be used as a baserock for a granule and coated with a high TSR coating. In some embodiments, fine glass particles may be used as a coating, as described in greater detail herein. The granules of the present disclosure have applicability with a variety of roofing materials, such as shingles, roll roofing, cap sheets, stone coated tile, as well as other non-roofing surfaces, such as walls, roads, walkways, and concrete.

Higher performance white granules can be used for commercial bitumen roofs. Granules that enable roofs with an initial TSR value of at least 70% of the total solar spectrum can meet new building energy rating requirements, resulting in considerably increased value of the roofing product. The granules themselves preferably have extremely high reflectivity, as there can be losses from granule post treatments and incomplete coverage of bitumen surface. Granule cup reflectivity requirements can be as high as about 78% to about 90%.

Three characteristics of ultra-white granules can include sufficiently high scattering power, sufficiently low absorption, and high UV blocking. Scattering power can be controlled by refractive index contrast and particle size. Titania is a useful pigment based on its high refractive index and low absorption.

Other approaches to enhanced scattering include the development or trapping of light scattering pores (as discussed in more detail below), lowering the refractive index of the binder matrix, or using lower cost pigments (such as, for example, alumina) that enhance overall scattering due to the ability to use larger quantities or trap small pores.

In some embodiments, the glass used to form the granules comprises a silicate glass, such as soda lime silica commonly used in windows and bottles. Borosilicates and other glasses can be used to achieve different heat treatment ranges, chemical durability, devitrification, or optical properties. In some exemplary embodiments, aluminosilicate glasses, phosphate glasses, borate glasses, and other suitable glasses as known in the art are used. In the case of high TSR granules, moderate to high purity, low iron glass compositions may be used. In some exemplary embodiments, the glass is a custom manufactured glass. In some exemplary embodiments, the glass is a pre-fused glass and/or recycled glass. Pre-fused glasses are glasses previously made by a melt process, and may include ordinary silicates such as soda lime silica, borosilicate, and other suitable materials. Recycled glasses are pre-fused glasses manufactured for an initial use, such as windows, bottles, labware, etc., for example, and re-processed for another use.

To form the granules, bulk glass is first treated to form a fine glass powder. In some embodiments, the glass particles have particle sizes ranging from about 0.3 μm to 10 μm. Glass powders can be formed by milling methods such as ball milling or attritor milling. In some embodiments, the glass powders is co-milled or post blended with pigments, binders, liquids, and/or other additives such that the additives may be partially or completely incorporated throughout the glass substrate of the resulting granule.

A green body of not fully strengthened or heat treated material results from forming dried bricks, cakes, pellets, aggregates, or agglomerates of the fine glass powder. In some exemplary embodiments, additives are included to improve green strength. For example, zinc additives such as zinc sulfate, and/or zinc borate may improve mechanical strength, and is further believed to improve the chemical durability of the final building material. Other additives, such as aluminosilicates, may also improve mechanical strength. Particle size of the fine glass powder is also believed to affect green strength, with a smaller particle size generally resulting in higher strength. An increased green strength may provide several manufacturing advantages including, for example, lowered production of unwanted fine particles in embodiments in which dried materials are subsequently crushed or reduced to a desired size, and less creation of dust during handling.

The green body formed from the fine glass particles may be heat treated to cause partial or full densification of the glass particulate structure. The heat treatment causes at least partial coalescence, fusing, viscous flow, or viscous sintering of the glass particles. Typically, heat treatment is done near or above the softening point of the glass. For example, for borosilicate glass, heat treatments from about 600° C. to about 1000° C. may be used.

One or more additives may be incorporated with the fine glass particles to lower the glass transition temperature of the glass particles. In various exemplary embodiments, nepheline syenite, feldspar, borax, spodumene, suitable fluxes, and other suitable additives as known in the art may be incorporated with the fine glass particles. Lowering the glass transition temperature may allow lower temperature and/or duration of heat treatment and thus is believed to provide energy savings and may allow incorporation of additives that may break down or otherwise be damaged at higher processing temperatures.

Variations on the described fabrication process are also possible. For example, dried materials larger than desired granule sizes can be crushed prior to or subsequent to firing. In addition, dried or fired material outside the desired granule size range can be recycled into the milling stage of the process. Further, dried particles of desired geometric shapes and sizes can alternatively be made without crushing by methods such as agglomeration, atomization, casting, molding, etc. of liquid slurries or gels. In an exemplary embodiment, such geometric shapes include regular shapes such as rectangular prisms, triangles, tetrahedrons, and other suitable shapes. Granules can thus be provided with a desired shape to optimize coverage, exhibit desired optical properties, or provide other features and characteristics, for example. Still further, components, coatings or additional materials can be adhered to or incorporated on the surfaces of the dried particles prior to firing. In some exemplary embodiments, a fully developed glass is formed in situ by heat treating a green body including glass components. The green body is brought to a temperature sufficient to melt the components to form a fully developed glass that may be physically and chemically similar or equivalent to various pre-fused glasses.

The granules of the present disclosure may be fabricated to include pores to affect the reflectivity of the granules. For example, pores may be formed by partial densification of fine glass particle agglomerates. Pore volume and pore size may be controlled in part by initial glass powder particle size distribution, and by the heat treatment time and temperature. Pores can also result from dissolved gas release during heat treatment, and the composition of the glass and/or additives can be incorporated or designed for this purpose. For high TSR granules, the porosity can be engineered or controlled to provide high reflectivity.

In some embodiments, pore sizes (e.g., diameter or largest distance across) range from less than 1 um to about 100 um. In other embodiments, pore sizes ranging from about 0.3 um to 10 um are preferred. In some cases, the granules include a pore volume percent of between about 0% and 35%. For example, in some preferred embodiments, the pore volume percent is between about 3% and 15%. Pore volume may be controlled to provide high reflectivity in combination with high mechanical durability. Such pore volume is believed to provide high reflectivity in combination with high mechanical durability. In other exemplary embodiments, pore volume percent of 15% to 20%, or greater than 20% may provide a suitable balance of reflectivity and high mechanical durability. In some exemplary embodiments, pore volume percent may be less than 3%. FIGS. 4A through 4E are scanning electronic microscope images of various exemplary embodiments showing two-dimensional views having less than approximately 18%, 16%, 9%, 10%, and 4% area percent of pores, respectively.

Densification of fine glass particles can be used to provide closed porosity of the pores in the granules, either because of local coalescence, surface sealing, or gas evolution. Closed pores can be advantageous for stain resistance or chemical durability. In some embodiments, the granules include a closed pore volume percent of at least about 3% and/or an open pore volume percent of no greater than about 5%.

In some exemplary embodiments, the glass particles are fully sintered or coalesced and fully densified to form a substantially pore free substrate. The glass substrate may exhibit less than 1% by volume of pores, less than 0.5% by volume of pores, nearly 0% by volume of pores, or 0% by volume of pores.

In exemplary embodiments, porosity of building materials derived from fine glass particles may be selected to provide a desired density. While pigments or additives such as titania, zinc oxide, or barium sulfate may have a relatively higher density, and thus raise the density, of the final granule, the porosity may be increased or decreased to increase or decrease the density of the granule. For example, a relatively higher porosity may result in a granule having a density of less than 2.5 g/cm$^3$ or less than about 2 g/cm$^3$, and a relatively lower porosity may result in a granule having a density of greater than 2.5 g/cm$^3$ or greater than about 3 g/cm$^3$, for example. A desired porosity may also be selected in which granules exhibiting different compositions may be blended. Controlling porosity such that granules having different compositions exhibit similar densities may promote uniform distribution and avoid segregation of the different granule types.

Building materials, such as roofing granules, as described herein include a relatively high volume of glass. In various exemplary embodiments, building materials, such as roofing granules, according to the present invention may include greater than 50% by volume of a glass, or greater than 75% by volume of a glass, or greater than 90% by volume of a glass. A building material having greater than 50% by volume of a glass, for example, results in a building material such as a roofing granule including a glass substrate that may incorporate one or more additives, or be coated with one or more coating compositions, to exhibit desired features and characteristics. In certain exemplary embodiments, a granule having 50% by volume of a glass may be desirable to provide specific features and characteristics, as described herein, for example, while in certain embodiments a granule having greater than 50%, 60%, 70%, 80%, 90%, 95% or nearly 100% may be suitable.

In some embodiments, fine glass particles may at least partially crystallize during heat treatment such that a portion of the building material is a glass-ceramic. In various exemplary embodiments, a roofing granule according to the present disclosure may include greater than 5% by volume of a glass-ceramic, or greater than 50% by volume of a glass-ceramic, or greater than 90% by volume of a glass-ceramic, and/or may include both glass portions and glass-ceramic portions.

Figure 1:
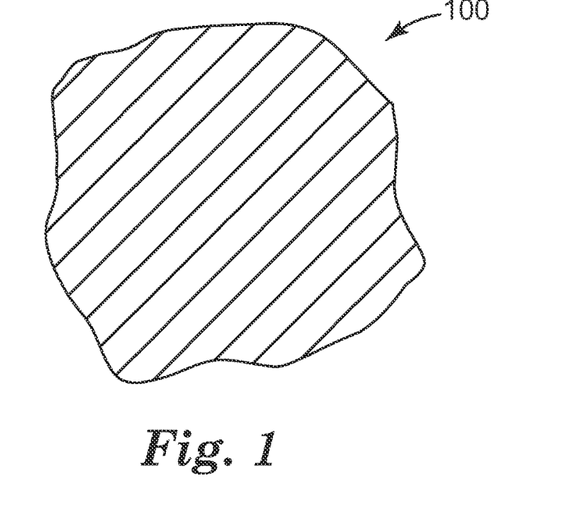
FIG. 1 shows an exemplary roofing granule according to the present disclosure.

FIG. 1 provides an exemplary embodiment of a roofing granule 100 having a glass substrate and a plurality of pores (not shown) within the glass substrate. Roofing granule 100 having features and characteristics as described herein may include a minimum total solar reflectance of at least 50%.

In an exemplary embodiment, roofing granules according to the present invention exhibit an average particle size between about 300 μm to about 5000 μm in diameter. A roofing granule as described herein allows various shapes or size distributions to be selected as may be suitable for a particular application. In an exemplary embodiment, roofing granules are provided having a narrow size distribution such that a high percentage of granules have a size within a small range from a median granule size. In various exemplary embodiments, 50%, 75%, or even 90% or more of granules have a mass within 30%, 20%, 10%, 5% or less than 5% of an average granule mass. Accordingly, granules according to the present invention may facilitate a more uniform size distribution that may provide advantages in application and coverage on a substrate, such as a substrate of a roofing shingle. In some exemplary embodiments, a bimodal distribution may be provided that include relatively larger flat square granules, for example, and small tetrahedrons to optimize coverage. Most of a substrate is covered by the relatively larger flat square granules while small tetrahedrons fill gaps that may otherwise exist between the square granules. In some embodiments, undesirable segregation of granules of differing sizes may be alleviated by controlling the density of the granules.

Pigments may be included in the granules to provide optical effects such as color, reflectivity, and UV blocking. For example, for high TSR granules, strongly scattering pigments such as titania can be used to provide both high reflectivity and UV blocking. Other pigments, such as alumina, silicates, and other oxides can also be used. For example, zinc oxides are moderately good scatterers and more UV absorbing in certain wavelength ranges (340-380 nm) than titania. Pigment types and amounts can be chosen based on performance, cost effectiveness, and compatibility with granule process temperatures. For example, in some embodiments, the granules comprise about 1-10 wt % titania. In some embodiments, the granules comprise titania and at least one other pigment. In some embodiments, the granules comprise a near UV absorbing pigment and an additional reflective pigment.

Cool granules reflect a significant portion of incident infrared light. In some cases, the cool granules may be formed of a glass material (such as those described above) bearing one or more coatings or layers of one or more infrared light reflecting pigments. A suitable pigment includes titanium dioxide, which yields a white appearance. Suitable pigments providing a yellow color include V-9415 and V-9416 (Ferro Corp., Cleveland, Ohio) and Yellow 195 (the Shepherd Color Company, Cincinnati, Ohio), all of which are considered yellow pigments.

In some cases, darker pigments may be used that have enhanced NIR reflectivity. These pigments include "10415 Golden Yellow," "10411 Golden Yellow," "10364 Brown," "10201 Eclipse Black," "V-780 IR BRN Black," "10241 Forest Green," "V-9248 Blue," "V-9250 Bright Blue," "F-5686 Turquoise," "10202 Eclipse Black," "V-13810 Red," "V-12600 IR Cobalt Green," "V-12650 Hi IR Green," "V-778 IR Brn Black," "V-799 Black," and "10203 Eclipse Blue Black" (all from Ferro Corp.); and Yellow 193, Brown 156, Brown 8, Brown 157, Green 187B, Green 223, Blue 424, Black 411, Black 10C909 (all from Shepherd Color Co.). Additional pigments of interest, some displaying enhanced infrared light reflectivity, are discussed in Sliwinski et al., U.S. Pat. Nos. 6,174,360 and 6,454,848, both of which are herein incorporated by reference, in their entirety. In other embodiments, the granules include non-IR reflective pigments.

The granules may be coated with one or more of these pigments using any desired technique or process. In some cases, the granules may be coated using an aqueous slurry of pigment, alkali metal silicate, an aluminosilicate, and an optional borate compound. The alkali metal silicate and the aluminosilicate act as an inorganic binder and are a major constituent of the coating. As a major constituent, this material is present at an amount greater than any other component and in some embodiments present at an amount of at least about 50 volume percent of the coating. The coatings from this slurry generally result in a ceramic.

Figure 2:
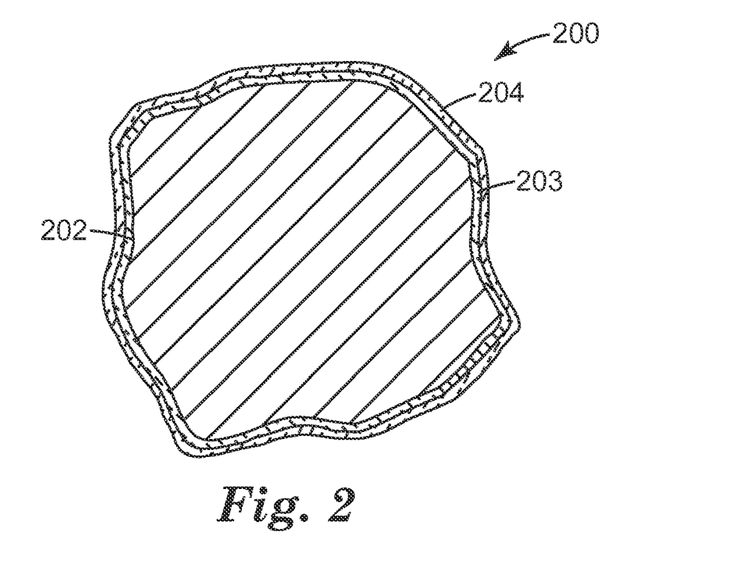
FIG. 2 shows an exemplary roofing granule including coatings according to the present disclosure.

FIG. 2 provides an exemplary embodiment of a roofing granule 200 including a glass substrate and a plurality of pores (not shown) within the glass substrate, as described herein, and exhibiting a surface 202 coated with a coating 203 that may include one or more components as described herein. In some exemplary embodiments, coating 203 may enter various pores (not shown) such that coating 203 covers surface 202 and/or at least some inner surfaces of granule 200. In some exemplary embodiments, a second coating 204 may be provided over coating 203.

Aqueous sodium silicate may be used due to its availability and economy, although equivalent materials such as potassium silicate may also be substituted wholly or partially therefore. The alkali metal silicate may be designated as $M_2O:SiO_2$, where M represents an alkali metal such as sodium (Na), potassium (K), mixture of sodium and potassium, and the like. The weight ratio of $SiO_2$ to $M_2O$ can range from about 1.4:1 to about 3.75:1. In some embodiments, ratios of about 2.75:1 and about 3.22:1 are particularly preferred, depending on the color of the granular material to be produced, the former preferred when light colored granules are produced, while the latter is preferred when dark colored granules are desired.

The aluminosilicate used can be a clay having the formula $Al_2Si_2O_5(OH)_4$. Another preferred aluminosilicate is kaolin, and its derivatives formed by weathering (kaolinite), moderate heating (dickite), or hypogene processes (nakrite). Other commercially available and useful aluminosilicate clays for use in the ceramic coating of the granules in the present invention are the aluminosilicates known under the trade designations "Dover" from Grace Davison, Columbia, Md. and "Sno-brite" from Unimin Corporation, New Canaan, Conn.

The borate compound, may be sodium borate available as Borax® (U.S. Borax Inc., Valencia, Calif.); however, other borates may be used, such as zinc borate, sodium fluoroborate, sodium tetraborate-pentahydrate, sodium perboratetetrahydrate, calcium metaborate-hexahydrate, potassium pentaborate, potassium tetraborate, and mixtures thereof. An alternative borate compound is sodium borosilicate obtained by heating waste borosilicate glass to a temperature sufficient to dehydrate the glass.

The structure of the granules can be controlled or selected based upon the application or use in a building construction article. The granules can have homogeneous distributions of pores and pigments, or can have regions within the granules that have different properties. For example, the granules can have core regions with one level of porosity or pigment, and shell or surface regions with a different level of pigment or porosity. Additionally, the granules can be regularly or irregularly shaped. The granules can also have a variety of shape profiles including, but not limited to, spherical, blocky, plate-like, or disk-like. The granules can also be engineered to have a desired shape and blended to provided preferred size and/or shape distributions for optimum packing on bituminous surfaces or for other functions.

Figure 5:
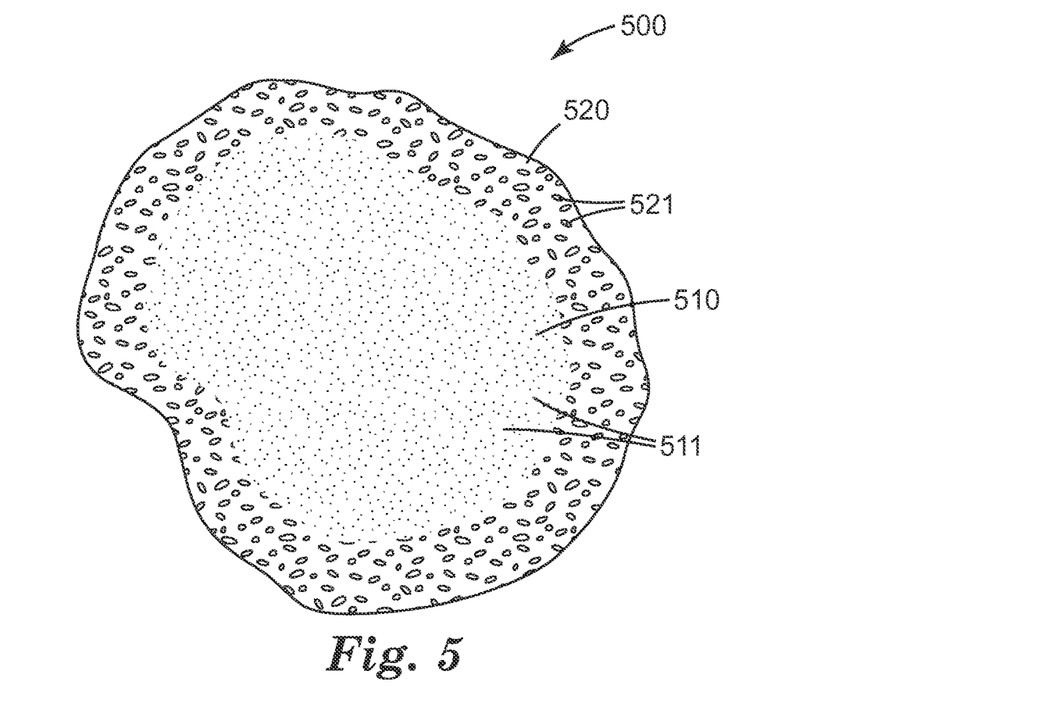
FIG. 5 shows a cross-sectional view of an exemplary granule according to the present disclosure including an inner zone and an outer zone.

FIG. 5 shows a cross-sectional view of an exemplary embodiment of a granule 500 having an inner zone 510 and an outer zone 520. Outer zone 520 at least partially surrounds, directly or indirectly, inner zone 510, and is different from inner zone 510 in at least one property. In various exemplary embodiments, inner zone 510 and outer zone 520 may provide different properties as a result of different material composition and/or selected manufacturing processes that result in a non-uniform granule. The properties of each zone may be selected to provide a granule as may be desired for a particular application or function. In various exemplary embodiments, the properties of inner zone 510 and outer zone 520 are selected to provide a combination of one or more of desired reflectivity, mechanical strength, UV opacity, stain resistance, long term weatherablity, reduced dust generation, or other properties.

Inner zone 510 and outer zone 520 each comprise a significant portion of the total volume of granule 500. In various exemplary embodiments, outer zone 520 may include at least 10% of the total volume of granule 500, or may include between approximately 10% and 90%, 20% and 70%, or between approximately 30 and 60% of the total volume of granule 500. In various exemplary embodiments, inner zone 510 may include at least 10% of the total volume of granule 500, or may include between approximately 10% and 90%, 20% and 70%, or approximately 30 and 60% of the total volume of granule 500. Thickness of zones 510 and 520 may be selected for a particular application or function. In various exemplary embodiments, outer zone 520 has an average thickness of between approximately 50 μm and 500 μm, and may vary at different locations on a granule. Such values may provide a desired balance of reflectivity, mechanical durability, and/or other properties described herein, for example.

The porosity of inner zone 510 and outer zone 520 may be controlled to result in a granule having a desired reflectivity, mechanical strength, UV opacity, stain resistance, long term weatherability, and/or reduced dust generation. In an exemplary embodiment, outer zone 520 has a greater porosity than inner zone 510, and may have a greater pore volume % and/or a greater quantity of pores. In some embodiments, pores 521 of outer zone 520 have a larger average size than pores 511 of inner zone 510. In other embodiments, pores 521 of outer zone 520 have a greater distribution throughout outer zone 520 and/or the total pore volume % in outer zone 520 may be greater than inner zone 510. An outer zone 520 having relatively greater porosity at least partially surrounding an inner zone 510 of relatively lesser porosity may result in a granule having a balance of high reflectivity and desired mechanical strength. The relatively porous outer zone 520 results in a higher reflectivity, while the less porous inner zone 510 provides additional mechanical strength and/or a desired level of UV absorption.

In an exemplary embodiment, granule 500 provides enhanced UV blocking by providing a combination of outer zone 520, having greater reflectivity due to the relatively higher porosity, and a more dense inner zone 510. In an exemplary embodiment, a high percentage of light is scattered and/or reflected by outer zone 520 while at least a portion of remaining UV light is blocked through absorption by inner zone 510 and/or outer zone 520. An exemplary granule 500 thus may provide high UV blocking while exhibiting relatively low UV absorption.

Pore quantity and size may be determined from, for example, SEM backscatterd electron imaging. Average pore size and quantity may be measured or estimated from a cross-sectional view, for example, by determining the area of pores versus the total area of a cross-section or zone of a cross-section. In an exemplary embodiment, the area percent of pores in inner zone 510 is less than the area percent of pores in outer zone 520. In various exemplary embodiments, an average area percent of pores in outer zone 520 is between approximately 1% and 20%, 2% and 15% or between approximately 3% and 10% and average area percent of pores in inner zone 510 is less than approximately 20%, 15%, 10% or less than approximately 5%. In various exemplary embodiments, an area percent of pores of inner zone 510 is less than approximately 90%, 75%, 50%, 35%, or less than 25% as compared to an area percent of pores in outer zone 520. The area percent for several cross-sections of a granule may be averaged to provide an average area percent of pores. In various exemplary embodiments, an area percent of pores, or an average area percent of pores, of inner zone 510 and inner zone 520, for example, is representative of a total volume percent of pores in inner zone 510 and outer zone 520. In an exemplary embodiment, outer zone 520 may have a pore volume percent of between approximately 1% and 20%, 2% and 15% or between approximately 3% and 10%.

The type of pores present in granule 500 affects the functionality and performance of granule 500. Closed pores may provide greater stain resistance, for example. Open pores may be suitable for certain applications, such as a controlled release of an additive. In an exemplary embodiment, the majority of pores in outer zone 520 are closed pores.

Various techniques may be used to manufacture a granule having an outer zone exhibiting a greater porosity than an inner zone, such as exemplary granule 500. In an exemplary embodiment, a granule 500 may be manufactured by forming dried bricks, cakes, pellets, aggregates, or agglomerates of a fine glass powder, as described above, to result in a green body. The green body of glass particles may be heat treated to cause partial or full densification of the particulate structure. The heat treatment causes at least partial coalescence, fusing, viscous flow, or viscous sintering of the glass particles. In an exemplary embodiment, dried granules, or other green bodies, may be heat treated in a direct-fired kiln, such as a direct-fired rotary batch kiln available from Feeco International of Green Bay, Wis. Direct firing of granules as described herein results in a substantial proportion of granules having at least an inner zone 510 and an outer zone 520.

The firing temperature and time at the firing temperature may be selected based on the material composition of the green body and the desired characteristics of the fired product. Typically, heat treatment is done near or above the softening point of the glass. In various exemplary embodiments, a green body in the form of a granule and including approximately 70% to 95% by weight of a milled borosilicate glass, for example, may be fired at a temperature of between approximately 600° and 1000° C., between approximately 700° and 900° C., or at approximately 735° C. The granules may be fired at this temperature for any suitable duration. For example, between approximately 1 and 60 minutes, between approximately 5 and 50 minutes, or for approximately 30 minutes. In some embodiments, a shorter duration at a relatively higher temperature may result in a granule having a more fully densified outer zone and less dense and/or more porous inner zone.

Granule 500 may be formed from uniform material composition, or may include one or more portions including different materials. In an exemplary embodiment, inner zone 510 and outer zone 520 are made from an identical material composition. The inner zone 510 and outer zone 520 may result from a homogenous green body of uniform material composition, such as a composition of milled glass particles, and in some embodiments including one or more additives. As the green body is subjected to heat treatment, for example in a direct-fired kiln as described above, the microstructure of the green body is altered in a non-uniform manner and inner zone 510 and outer zone 520 develop. As described above, the inner zone 510 and outer zone 520 may have different porosity or other differences in microstructure that impart different properties on inner zone 510 and outer zone 520.

Alternatively or in addition, granule 500 may be made from a green body having a substantially uniform chemical composition but including particles of different sizes in various regions of the green body. The particle size may be selected to result in a granule 500 having an inner zone 510 and an outer zone 520. In an exemplary embodiment, a green body having smaller glass particles in an inner region and larger glass particles in an outer region may result in a granule 500 having an outer zone 520 having greater porosity and/or greater pore volume than an inner zone 510.

In various exemplary embodiments, granule 500 is formed from two or more materials, or includes additives in selected portions of granule 500 such that granule 500 includes an inner zone 510 and an outer zone 520 as described herein. In an exemplary embodiment, one or more additives are included in a portion of the fine glass powder before forming an unfired green body. After firing, and/or other post-firing treatment, a granule 500 is provided including an inner zone 510 and an outer zone 520. One or more additives may be present in only either inner zone 510 or outer zone 520, or present in both in different amounts. In some exemplary embodiments, additives added to the green body before firing may react or otherwise interact with other components of the green body to affect the microstructure of granule 500.

For example, one or more additives may be provided before firing that contribute to an increased porosity of outer zone 520 and/or relatively lower porosity of inner zone 510. In various exemplary embodiments, carbonates, such as calcium carbonate, hydrated oxides, or other suitable materials and combinations of materials may be included that create additional porosity during firing.

Fine glass powders as described herein may also be used as a coating on various substrates. In various exemplary embodiments, granule 500 includes an inner zone 520 including a mineral baserock, such as quartz, andesite, coal slag, diabase, metabasalt, nepheline syenite, quartzite, rhyo- dacite, rhyolite, gravel or other suitable materials. Inner zone 520 may also include larger glass particle, or other suitable material. The fine glass powders may be coated onto a mineral baserock, glass particle, or other suitable material, and fired as described herein to result in a granule having an inner zone 510 and outer zone 520, and may include any suitable additive such as pigments, photocatalytic particles, algicidal particles, infrared particles, thermally conductive particles, electrically conductive particles, and/or other suitable materials as may be desired for a particular application.

In various exemplary embodiments, granule 500 may be formed from a process including two or more firing steps. For example, a green body may first be fired to form an inner zone. The inner zone may than coated and subsequently fired to form a granule 500 including an inner zone and an outer zone.

Figure 6:
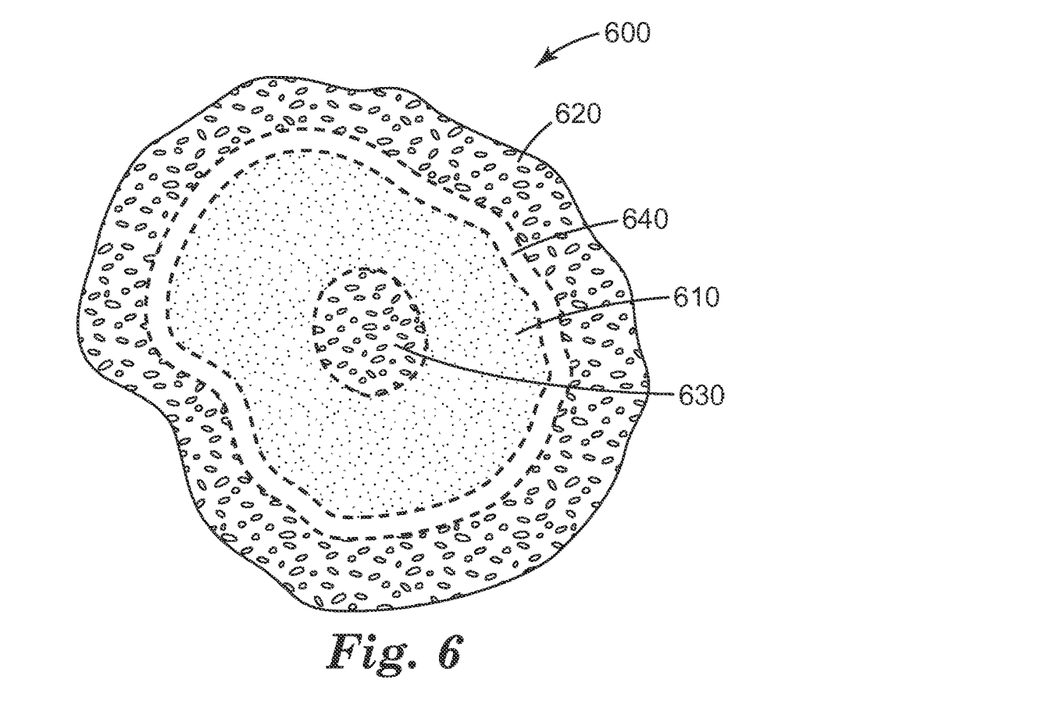
FIG. 6 shows a cross-sectional view of an exemplary granule according to the present disclosure including a core zone, an inner zone, an intermediate zone, an outer zone and an exterior zone.

FIG. 6 shows a cross-sectional view of an exemplary embodiment of a granule 600 having an inner zone 610, an outer zone 620, a core zone 630, an intermediate zone 640, and an exterior layer. Outer zone 620 indirectly at least partially surrounds inner zone 610. An intermediate zone 640 is between at least a portion of outer zone 620 and inner zone 610. Inner zone 610, outer zone 620, and intermediate zone 640 each at least partially surround core zone 630, directly or indirectly. One or more additional layers may at least partially surround or be at least partially surrounded by one or more of inner zone 610, outer zone 620, core zone 630, and intermediate zone 640. One or more of inner zone 610, outer zone 620, core zone 630, and intermediate zone 640 may be formed from the materials and techniques as described herein. Intermediate zone 640 and core zone 630 may exhibit differences from inner and/or outer zones 610, 620, respectively, in at least one property. In various exemplary embodiments, core zone 630 has a porosity that may be greater than or less than a porosity of inner zone 610 depending on the materials and manufacturing processes, for example, of granule 600.

Granules as described herein may be used in any suitable building materials, such as shingles, roll roofing, cap sheets, stone coated tile, as well as other non-roofing surfaces, such as walls, roads, walkways, and concrete. In various exemplary embodiments, building materials include a plurality of granules, such as granules 500, 600, that include an inner zone and an outer zone. In some exemplary embodiments, substantially all granules include an inner zone and an outer zone, while in other embodiments only a portion of granules include an inner zone and an outer zone. Granules 500, 600, may be mixed with other types of granules. In some embodiments, only a portion of granules develop an inner zone and an outer zone during manufacturing. A building material may be provided having a plurality of granules in which greater than 30%, greater than 50%, greater than 70%, greater than 90%, or substantially 100% of granules include an inner zone and an outer zone.

Building materials derived from fine glass materials as described herein are believed to provide several advantages. For example, granules from fine glass materials that are sintered, fused, coalesced or otherwise formed at a relatively low temperature near a softening point of the fine glass materials allow pigments and/or other additives mixed with the fine glass particle to exist undamaged and/or unchanged. That is, the pigments and/or other additives may be partially or completely incorporated throughout the glass substrate of the granule while not being functionally altered by the manufacturing process, resulting in a roofing granule having a high percentage of glass and features and characteristics as may be desired for a particular application.

Furthermore, granules and other building materials derived from fine glass particles and exhibiting an outer zone having a greater porosity than an inner zone may provide a unique combination of high reflectivity and UV absorption. The presence of closed pores in the outer zone also prevents staining of the granule that can affect the appearance of the granule on a roof, for example, and thus such a granule may allow for greater control of its aesthetic qualities and maintenance of the desired appearance for an extended period of time. Accordingly, granules and other building materials as described herein can provide a unique combination or features and characteristics that can reduce energy costs while providing a highly durable material capable of providing a desired aesthetic appearance for an extended period of time.

Figure 3:
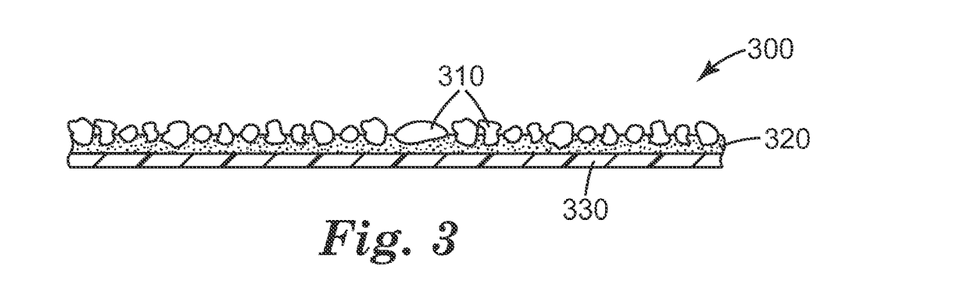
FIG. 3 shows an exemplary roofing product including a plurality of roofing granules according to the present disclosure.
Figure 4A:
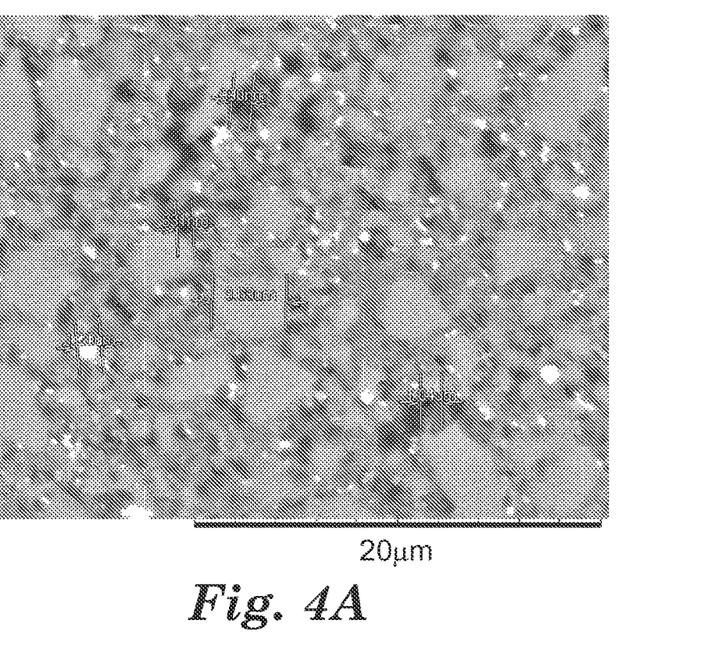
FIGS. 4A-4E are scanning electron microscope images illustrating porosities of example roofing granules formed according to embodiments of the present disclosure.
Figure 4B:
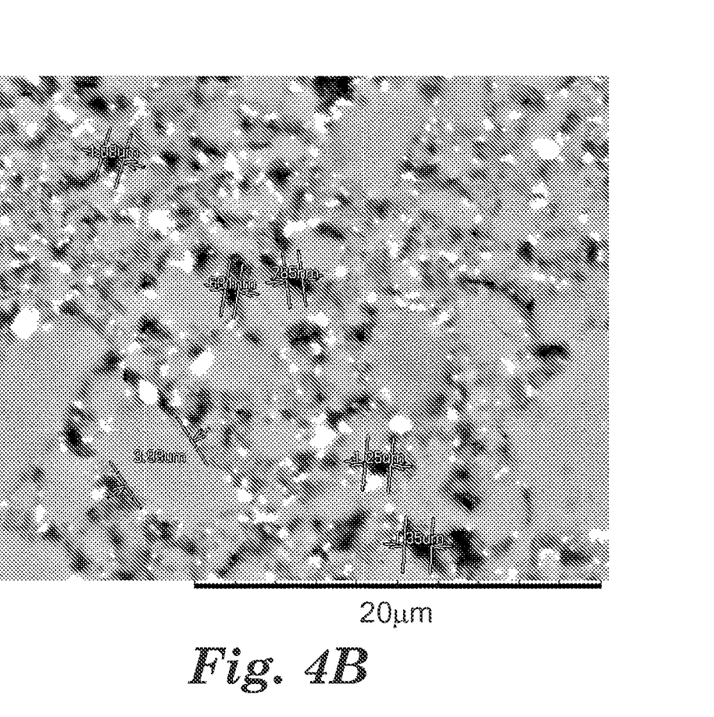
Figure 4C:
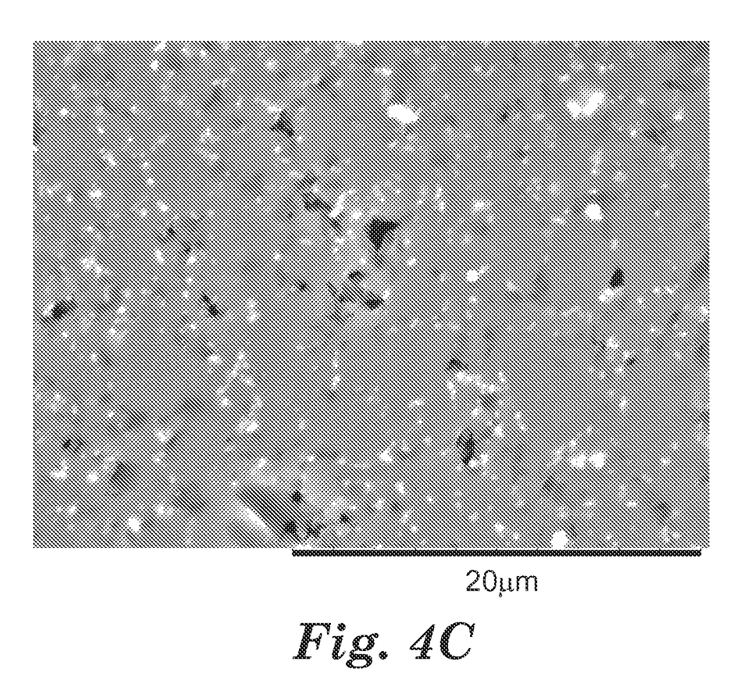
Figure 4D:
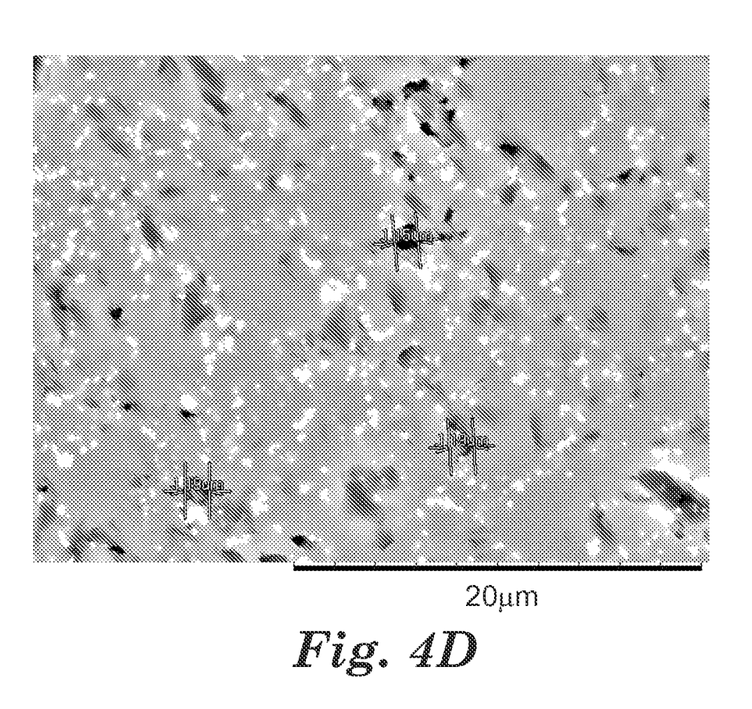
Figure 4E:
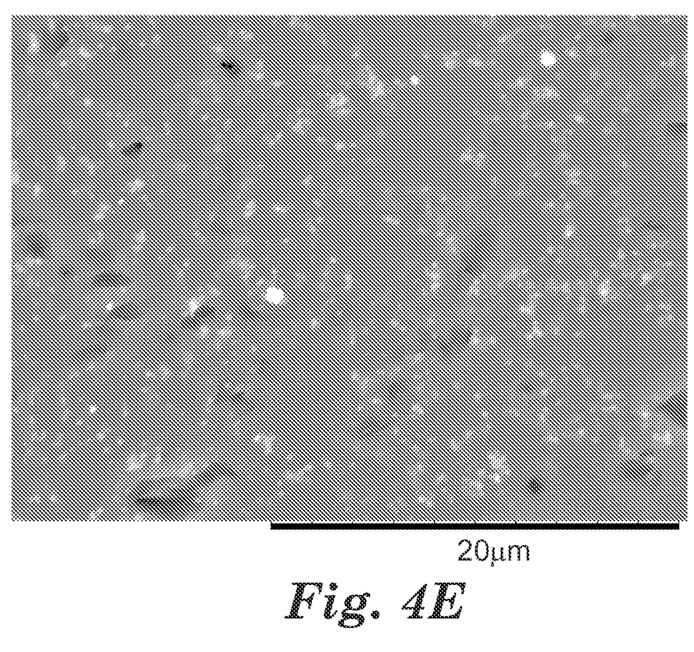

Building materials derived from fine glass particles may be incorporated into suitable building products, such as shingles, roll roofing, cap sheets, stone coated tile, as well as other non-roofing surfaces, such as walls, roads, walkways, and concrete. FIG. 3 shows an exemplary roofing product 300 including a plurality of roofing granules 310 according to the present invention each having a glass substrate with a plurality of pores. Roofing product 300 includes an adhesive layer 320 that adheres granules 310 to substrate layer 330. In some exemplary embodiments, substrate layer 330 may be an asphalt-based substrate including an asphalt saturated material. In other exemplary embodiments, substrate layer 330 may be a film or intermediate layer that may be subsequently joined to an asphalt-based substrate or other substrate.

EXAMPLES

The following specific, but non-limiting examples will serve to illustrate the disclosure.

Three methods of processing were used to generate granule samples for testing of examples 1 through 9: (1) Glass is wet milled, slurry is dried, fired, and then crushed into −12+40 grade (Examples 1-3); (2) Glass is wet milled, slurry is shaped and dried in mold, released from mold, and fired (Examples 4a-4e); (3) Glass is wet milled, slurry is dried, crushed into −12+40 grade, and then fired. (Examples 5-9). Results for samples made using each of the three processing methods are shown in Tables 1-3.

For all examples, reflectivity was measured using a model SSR-ER v6 Solar Spectrum Reflectometer, available from Devices and Services Co. of Dallas, Tex., using a 1.5 E air mass setting. For "Cup" measurements, granules were loaded into a sample holder with a depth of approximately 5 mm. The surface of the granules was leveled using a roller. For "Flat" measurements, granules were poured over 471 black vinyl tape, available from 3M Co. of St. Paul, Minn., and pressed to adhere. Pouring and pressing steps repeated 3 to 5 times to ensure good granule coverage on the tape.

For all examples, coverage was measured using I-SOLUTION image analysis software available from IMT-Digital. Area analysis was performed using a manual thresholding tool to determine percentage of the black surface covered by the granules.

Examples 1-3 were prepared by attritor milling glass, obtained by crushing unused clear glass vials of a borosilicate composition. The attritor milling was performed using a Union Process Model 01HD/HDDM Attritor, and adding glass to $H_2O$ at 70% solids loading, and milling with 5 mm yttria-stabilized-zirconia (YSZ) media for three hours. The median primary particle size after milling was 1.3 microns. The slurry was divided into three equal portions, and to each portion was added different types and amounts of pigments (in percentages based on weight of glass solids), as shown in Table 1. After adding the pigments, the slurries were ball milled for approximately one hour with 5 mm YSZ media to homogeneously disperse the pigments. The three prepared slurries were then poured into Pyrex dishes lined with Teflon film, and dried in an oven at 100° C. overnight. The dried slurry "slabs" were then heat treated at 850° C. for four minutes in a box furnace. This heat treatment allowed for viscous sintering of the glass particles to occur and to trap both pores and pigments. The sintered glass slabs were then crushed using a mortar and pestle and sieved to obtain a −12+40 size fraction for analysis. Results are shown below in Table 1.

TABLE 1

|  | Example | | |
|---|---|---|---|
|  | 1 | 2 | 3 |
| HT Temp (° C.) | 850 | 850 | 850 |
| Time (min) | 6 | 6 | 6 |
| Raw Materials | | | |
| Clean Milled Vial Glass | 91 | 93 | 84 |
| Laponite-RDS | 1 | 1 | 1 |
| RCL-9 $TiO_2$ | 4 | 6 | 5 |
| AC34 $Al_2O_3$ | 0 | 0 | 10 |
| Gold Seal ZnO | 4 | 0 | 0 |
| Reflectivity | | | |
| Cup −12 + 40 | 0.869 | 0.881 | 0.877 |
| Cup −16 + 20 | — | 0.863 | 0.853 |
| Flat −12 + 40 | 0.655 | 0.702 | 0.685 |
| Flat −16 + 20 | 0.620 | 0.664 | 0.672 |
| Coverage | | | |
| −12 + 40 | 0.933 | 0.940 | 0.929 |
| −16 + 20 | 0.887 | 0.893 | 0.895 |

Examples 4a-4e were prepared using a slurry-making process similar to that for Examples 1-3, Examples 4a-4e were compositionally identical to Example 2, which had the highest TSR value of the first 3 examples, 0.702, on a flat black tape. The median glass particle size in the slurry was 1.3 microns. The slurry batch with added pigments was shaped into 2 mm×2 mm×0.5 mm cavities, dried, and then released from the mold. The resulting "tiles" were then fired to various temperatures for either four or eight minutes as represented by Examples 4a-4e shown in Table 2 below and scanning electron microscope (SEM) images revealing the degree of trapped porosity in these samples are shown in FIGS. 4A-4E, respectively.

TABLE 2

|  | Example | | | | |
|---|---|---|---|---|---|
|  | 4a | 4b | 4c | 4d | 4e |
| HT Temp (° C.) | 700 | 700 | 750 | 750 | 800 |
| Time (min) | 4 | 8 | 4 | 8 | 4 |
| Raw Materials | | | | | |
| Clean Milled Vial Glass | 93 | 93 | 93 | 93 | 93 |
| Laponite-RDS | 1 | 1 | 1 | 1 | 1 |
| RCL-9 $TiO_2$ | 6 | 6 | 6 | 6 | 6 |

TABLE 2-continued

| | Example | | | | |
|---|---|---|---|---|---|
| | 4a | 4b | 4c | 4d | 4e |
| Reflectivity | | | | | |
| Cup 2 × 2 × 0.5 mm | | 0.878 | | | |
| Flat 2 × 2 × 0.5 mm | 0.672 | 0.644 | 0.630 | 0.605 | 0.633 |
| Coverage | | | | | |
| Flat 2 × 2 × 0.5 mm | 0.835 | 0.775 | 0.7732 | 0.7836 | 0.804 |

Examples 5-9 were prepared using a slurry-making process similar to that for Examples 1-3. Primary glass particle sizes in the slurries ranged from median values of 1.2 to 1.5 microns. The slurries with added pigments were pan-dried, similar to that for Examples 1-3. The dried slurry cakes were then crushed using a mortar and pestle, and the crushed particles were sieved to obtain a −12+40 size fraction for analysis. The resulting green granules were then fired to various temperatures for either four or seven minutes. Results are shown below in Table 3.

TABLE 3

| | Example | | | | |
|---|---|---|---|---|---|
| | 5 | 6 | 7 | 8 | 9 |
| HT Temp (° C.) | 775 | 750 | 775 | 775 | 875 |
| Time (min) | 7 | 4 | 7 | 7 | 7 |
| Raw Materials | | | | | |
| Clean Milled Vial Glass | 91.5 | 91.5 | 91 | 91 | 89 |
| Laponite-RDS | 1.5 | 1.5 | 0 | 3 | 1 |
| RCL-9TiO$_2$ | 7 | 7 | 6 | 6 | 10 |
| CaSiO$_3$ | 0 | 0 | 3 | 0 | 0 |
| Reflectivity | | | | | |
| Cup −12 + 40 | 0.892 | 0.900 | 0.867 | 0.890 | 0.892 |
| Flat −12 + 40 | 0.715 | 0.716 | 0.665 | 0.691 | 0.701 |
| Coverage | | | | | |
| Flat −12 + 40 | 0.920 | 0.913 | 0.877 | 0.924 | 0.904 |

Examples 10 through 12 and Comparative Example 13 were prepared from unused borosilicate glass tubing, available from Nipro Glass of Millville, N.J., that was wet ball milled to d50 of about 2 microns through approximately 40 hrs of milling time. Titanium dioxide (Tiona RCL-9, available from Millenium Chemicals of Hunt Valley, Md.) was added to the slurry and mixed in the ball mill for an additional five hours. The resulting slurry had a solid portion content of approximately 10% by weight titanium dioxide and 90% by weight milled borosilicate glass, and a moisture content of approximately 27.68%. The slurry was agglomerated using a Bepex Turbulizer TCJS-8 available from Bepex International of Minneapolis, Minn. The agglomerated granules were dried in a fluid bed drier and screened to −10+28 mesh.

Examples 10 through 12 were made by firing the dried granule in a direct-fired rotary batch kiln, available from Feeco International, having an inner diameter of 20 in. and length of 24 in. The kiln was loaded with approximately 0.45 cubic ft. of granules. The kiln reached 735° C. approximately 35 minutes after granules were loaded in the kiln. Granules of Examples 10, 11, and 12 were loaded into the kiln in a single batch, but removed from the kiln after 20 minutes, 30 minutes, and 35 minutes, respectively, after the kiln reached approximately 735° C.

Comparative Example 13 was made by firing the dried granules in an indirect-fired continuous rotary kiln available from Feeco International. The kiln tube had 6 in. diameter and a feed rate of approximately 20 to 25 lbs/hr. The kiln hot zone was approximately 36 in. long and the kiln temperature was set to 760° C.

The resulting samples were tested for color and reflectivity, and the results of the color and reflectivity measurements are shown in Table 4. The direct-fired granules of Examples 10, 11, and 12 each exhibited unexpected improved reflectivity as compared to the indirect fired granules of Comparative Example 13. Each of examples 10, 11 and 12 exhibited an average measured total solar reflectivity of greater than 81% while comparative example 13 exhibited a measured average total solar reflectively of about 75%.

The measured color also differed between the direct-fired granules of Examples 10, 11, and 12 and the indirect-fired granules of Comparative Example 13. Examples 10, 11, and 12 were approximately 2 units lighter in L* and 1 unit less yellow in b*.

TABLE 4

| | Example | | | Comparative |
|---|---|---|---|---|
| | 10 | 11 | 12 | Example 13 |
| Temp (° C.) | 735 | 730 | 735 | 760 |
| Time (min) | 20 | 30 | 35 | 20 |
| Raw Materials | | | | |
| Milled Glass | 90 | 90 | 90 | 90 |
| TiO$_2$ | 10 | 10 | 10 | 10 |
| Reflectivity | | | | |
| Cup −12 + 40 | 0.814 | 0.813 | 0.813 | 0.751 |
| Color | | | | |
| L* | 89.57 | 89.45 | 89.49 | 87.49 |
| a* | 1.12 | 0.95 | 0.91 | 0.22 |
| b* | 9.50 | 9.64 | 9.67 | 10.90 |

Figure 7:
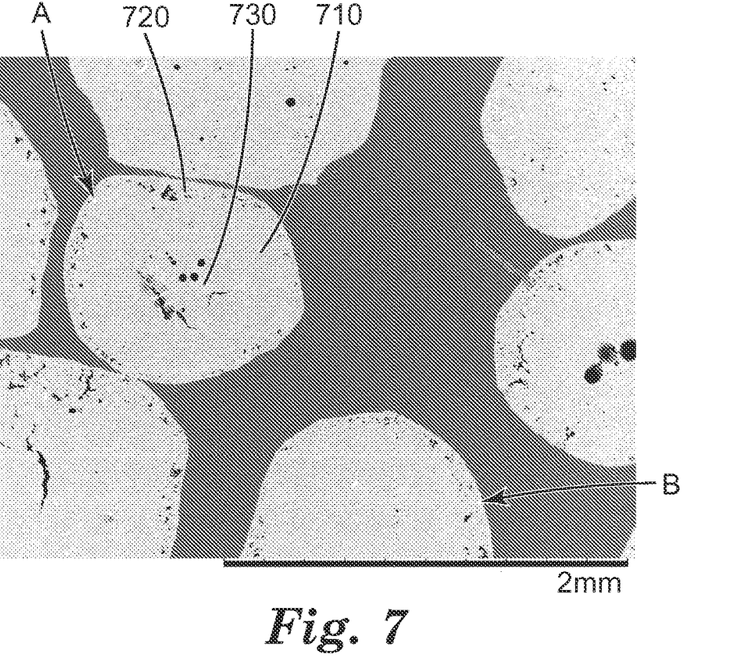
FIGS. 7 through 9 are scanning electron microscope images illustrating porosities of example granules formed according to embodiments of the present disclosure.

The performance differences between Examples 10, 11 and 12 are believed to be due to the unexpected differences in microstructure between the direct fired granules of Examples 10, 11 and 12 and the indirect-fired granules of Comparative Example 13. These differences may be observed in SEM Backscattered Electron Imaging of the respective granule examples. FIG. 7 is a low magnification SEM image of the cross-section of granules of Example 10. The image was obtained from granules of Example 7 potted in a cured epoxy resin and polished such that greater than 50% of exposed granules are polished past a midpoint of the granule. As may be observed, many granules have an outer zone 720 having relative greater porosity and greater pore volume than an inner zone 710 surrounded by the outer zone 720. Some granules, such as granule A, exhibit a core zone 730 having a concentration of relatively large pores. Other granules, such as granule B exhibit a core zone that appears to have no significant difference in porosity as compared to an inner zone.

Granule A has an area percent of pores in an outer zone of approximately 5.5%, an area percent of pores in an inner zone of approximately 0.2%, and an area % of pores in a core zone of approximately 10.2%, based on an analysis of the image of granule A in which black pixels are representative of pores. The outer zone, inner zone and core zone included approximately 37%, 41% and 22%, respectively, of the total cross-sectional area of Granule A shown in FIG. 7.

Figure 8:
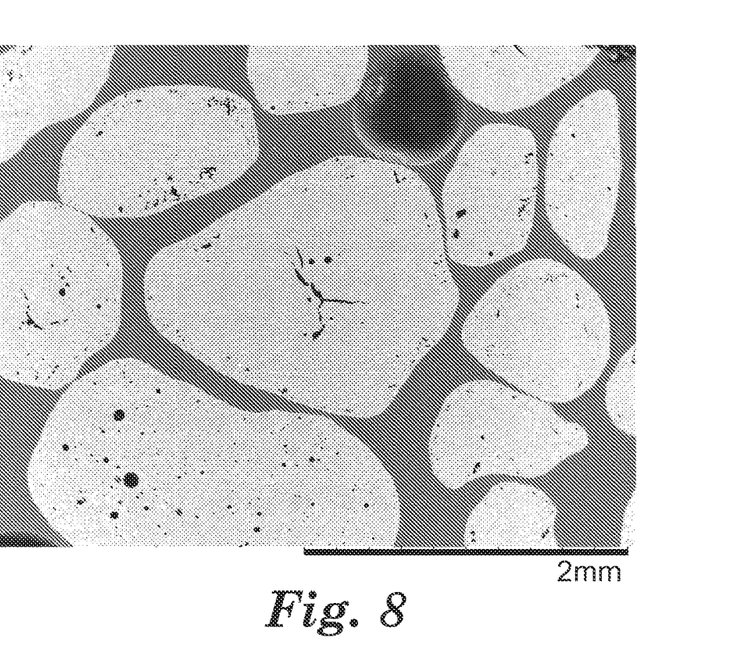
Figure 9:
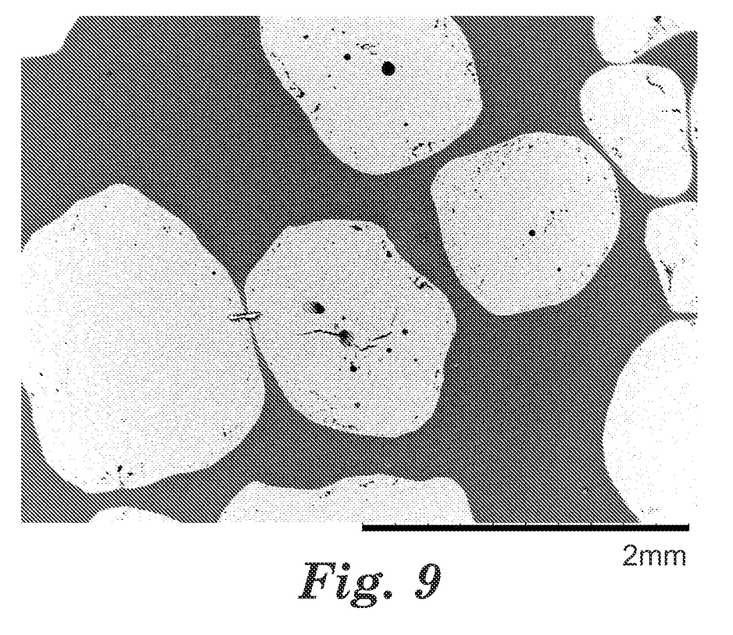

FIGS. 8 and 9 are low magnification images of a cross-section of granules of Examples 11 and 12, respectively. Similar to the granules of Example 10, many granules of Examples 11 and 12 have outer zones having relative greater porosity and greater cell volume than inner zones surrounded by the outer zones. An exemplary granule of Examples 11 and 12 shown in FIGS. 8 and 9 exhibit an area percent of pores in an outer zone of approximately 3.3% and 3.9%, respectively, an area percent of pores in an inner zone of approximately 0.1% and 0.7%, respectively, and an area % of pores in a core zone of approximately 5.3% and 8.5%, respectively. In the granule of Example 11, the outer zone, inner zone and core zone included approximately 33%, 49% and 18%, respectively, of the total cross-sectional area. In the granule of Example 12, the outer zone, inner zone and core included approximately 41%, 29% and 30%, respectively, of the total cross-sectional area.

Figure 10:
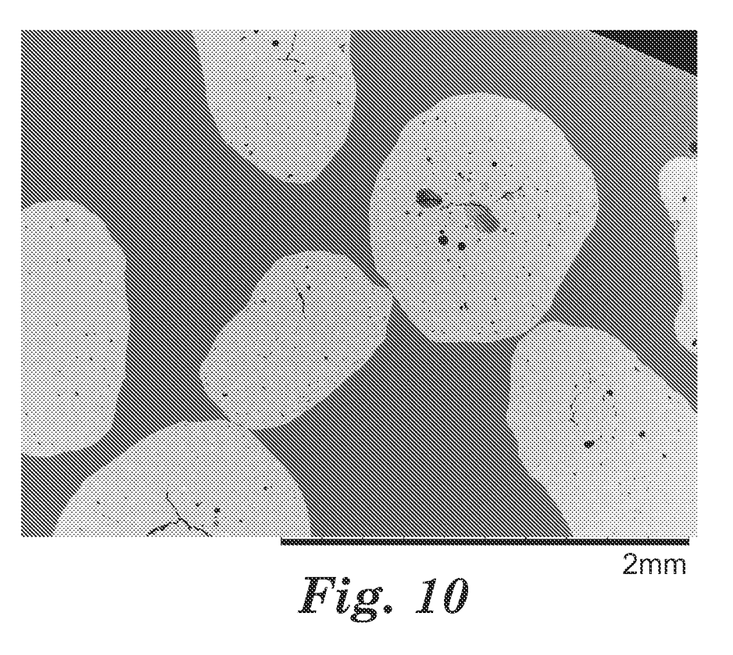
FIG. 10 is a scanning electron microscope image of granules of Comparative Example 13.
Figure 11:
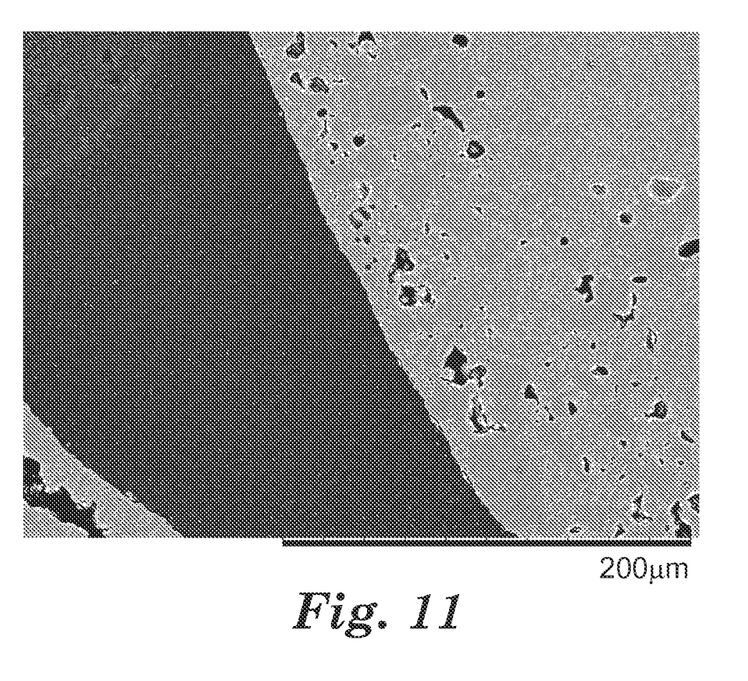
FIG. 11 is a scanning electron microscope image illustrating porosity of an example granule formed according to embodiments of the present disclosure.

FIG. 10 is a low magnification image of a cross-section of granules of Comparative Example 13. The granules exhibit pores of varying sizes throughout the granule and do not appear to exhibit an outer zone of greater porosity or pore volume surrounding an inner zone of relatively lower porosity of pore volume FIG. 11 is an image of a cross-section of granules of Example 12 showing the porosity at an outer zone and inner zone. The dark or black regions are pores, and are visibly larger and more frequent in the outer zone as compared to an inner zone. The pores of outer zone are of a similar scale as the borosilicate glass grains shown in grey. The inner zone includes pores of a much smaller scale, if present at all.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features. The foregoing detailed description and examples have been given for clarity of understanding only. No unnecessary limitations are to be understood there from. Any feature or characteristic described with respect to any of the above embodiments can be incorporated individually or in combination with any other feature or characteristic, and are presented in the above order and combinations for clarity only. Thus, the scope of the present disclosure should not be limited to the exact details and structures described herein, but rather by the structures described by the language of the claims, and the equivalents of those structures.

The invention claimed is:

1. A building material, comprising:
   a granule having an inner zone and outer zone at least partially surrounding the inner zone, wherein the inner zone and outer zone each comprise greater than 30% of a total volume of the granule and the granule comprises greater than 60% by volume of a glass; wherein the outer zone has greater porosity than the inner zone.

2. The building material of claim 1, wherein the outer zone comprises greater than 50% by volume of a glass.

3. The building material of claim 1, wherein the inner zone comprises greater than 50% by volume of a glass.

4. The building material of claim 1, wherein the outer zone has an average pore volume between 2% and 15%.

5. The building material of claim 1, wherein the inner zone and outer zone are formed from the same material.

6. The building material of claim 1, wherein the granule is a roofing granule.

7. The building material of claim 1, wherein the granule comprises an intermediate zone at least partially between the inner zone and outer zone.

8. The building material of claim 1, wherein the granule comprises a core zone, and the inner zone and outer zone surround the core zone.

9. The building material of claim 1, wherein the outer zone comprises an exterior surface of the granule.

* * * * *